Feb. 4, 1930.　　　　G. M. DEMING　　　　1,745,785
PRESSURE REGULATOR
Filed March 4, 1927　　　2 Sheets-Sheet 1
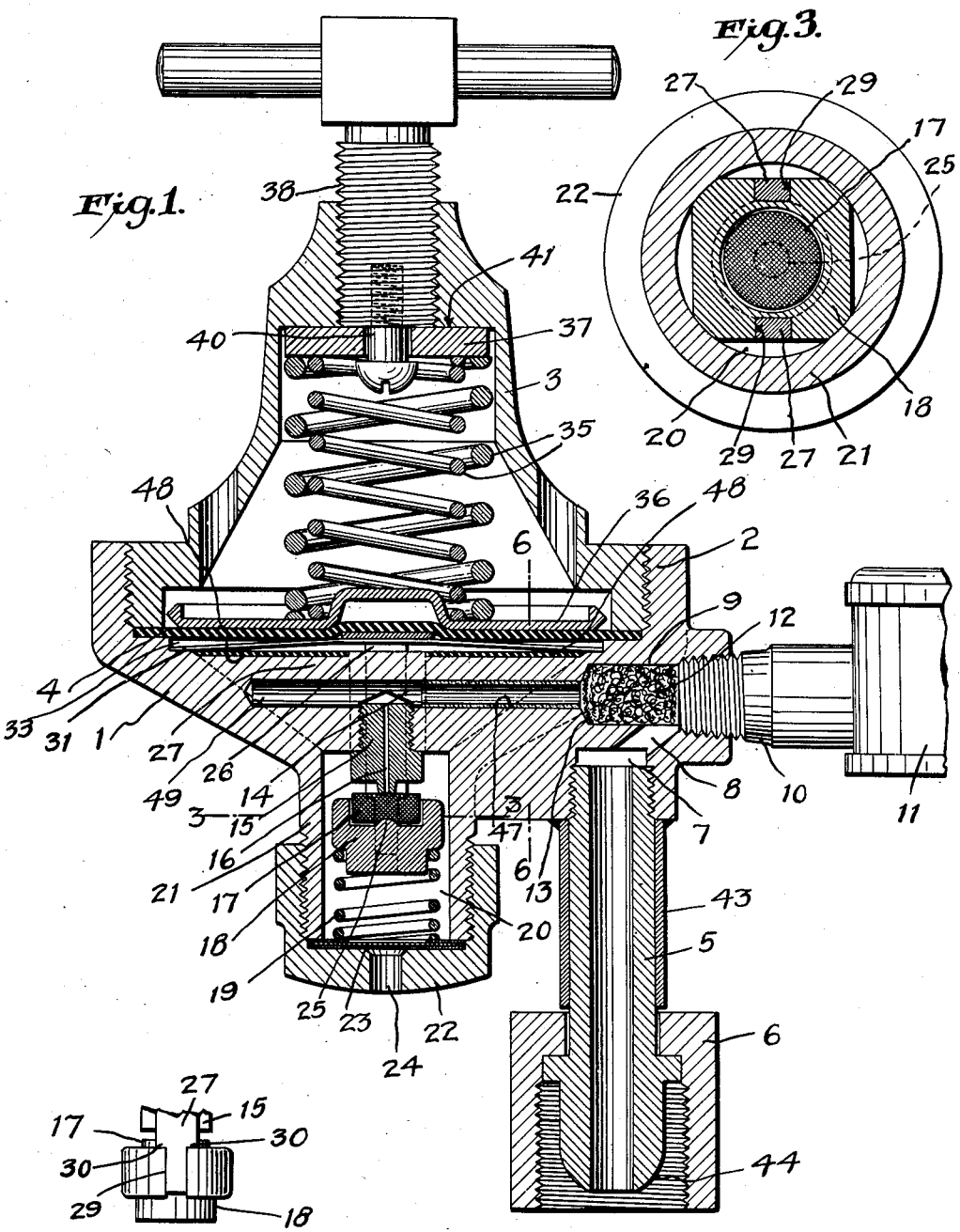
INVENTOR
George M. Deming
BY
ATTORNEY Feb. 4, 1930.  G. M. DEMING  1,745,785
PRESSURE REGULATOR
Filed March 4, 1927   2 Sheets-Sheet 2
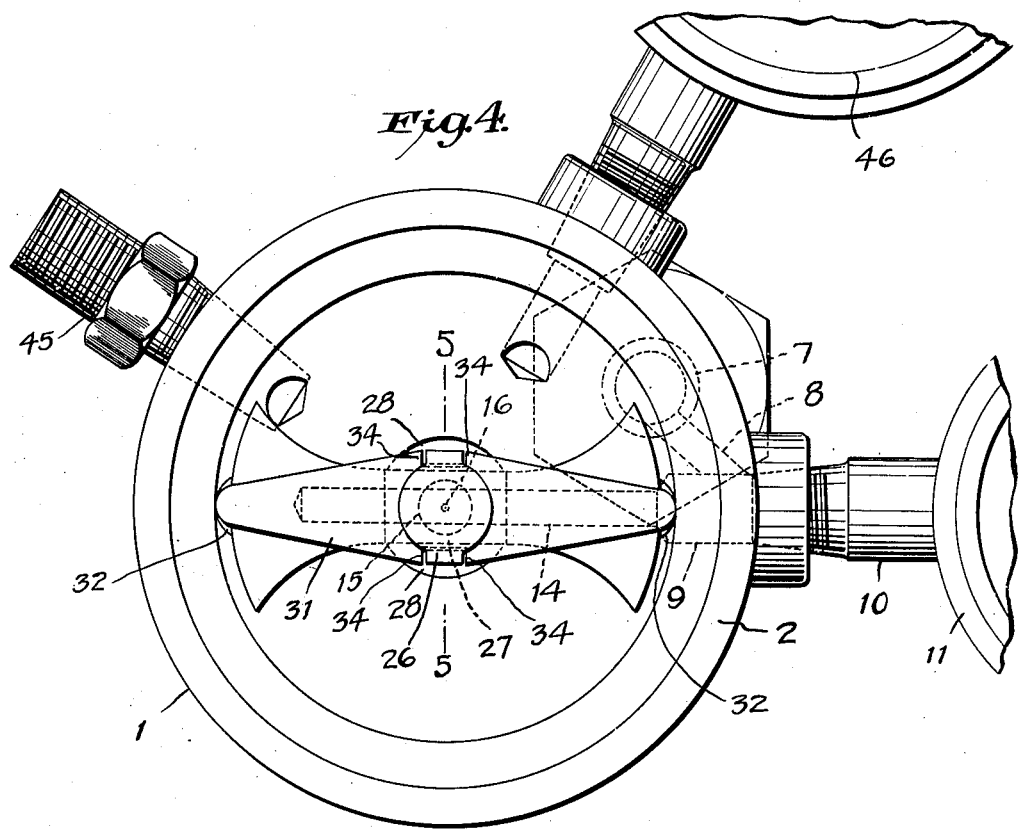
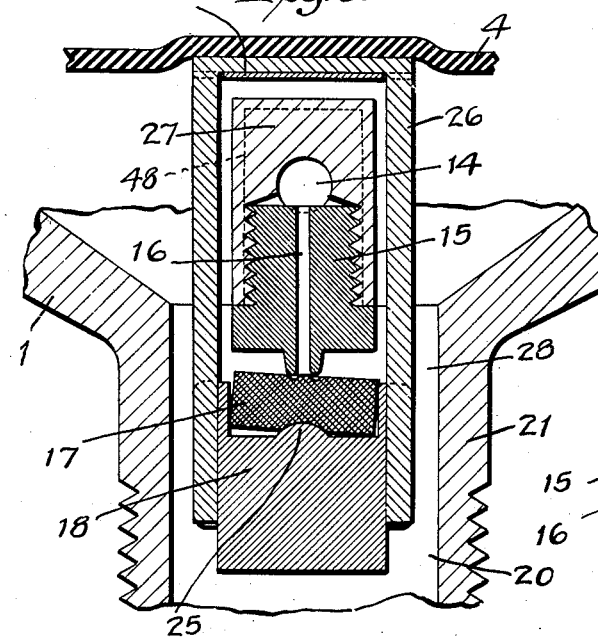
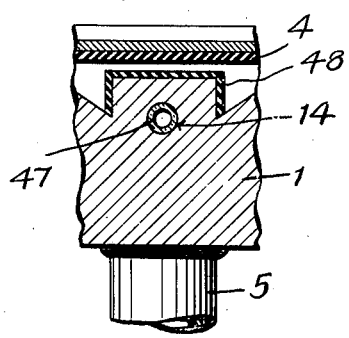
INVENTOR
George M. Deming
BY
ATTORNEY Patented Feb. 4, 1930

1,745,785

UNITED STATES PATENT OFFICE

GEORGE M. DEMING, OF JERSEY CITY, NEW JERSEY, ASSIGNOR TO AIR REDUCTION COMPANY, INCORPORATED, OF NEW YORK, N. Y., A CORPORATION OF NEW YORK

PRESSURE REGULATOR

Application filed March 4, 1927. Serial No. 172,616.

The object of the invention is to provide certain features novel in gas pressure regulators, including reducing valves, whereby the operation of such regulators is materially improved and made more reliable, and their serviceability greatly prolonged, whereby the parts are safeguarded against injury and abuse, whereby manufacture and assembling are facilitated, and whereby it is made easy to get at and remove parts for inspection and repair.

In the use of such regulators it has often been found that the reduced operating pressure undergoes serious fluctation and a comparatively rapid falling off, due to freezing, which takes place under certain conditions, especially when the atmospheric temperature is rather low and the rate of outflow from the regulator is high. The gas traversing the inlet passages of the regulator experiences a precooling, resulting from the low temperature of the gas within the regulator body as compared with that of the gas within the regulator inlet passages and as compared with the room temperature. The gas in passing from the cylinder through the regulator undergoes no marked expansion until it leaves the regulator nozzle. At this point there is an approximately adiabatic expansion. In consequence, the gas within the regulator body may be very cold unless the cylinder or supply pressure is quite low. Cylinder pressures of many atmospheres are customary for compressed oxygen. The result is to freeze minute drops of moisture from the normal moisture content of the gas, forming very small ice crystals, which seriously choke the discharge from the nozzle, causing the operating pressure to fall off, and which may cement the seat to the nozzle so as to prevent the functioning of the regulator entirely.

The principal means which I have developed for overcoming such conditions involves the provision of thermal insulating materials within the regulator high pressure passage or around the body portion through which this passage penetrates. In this manner I greatly limit the transfer of heat from the gas within the passage to the gas within the main cavity of the regulator body, and thereby succeed in greatly reducing the precooling effect, and thus prevent the choking of the nozzle or the freezing of the regulator.

Faulty operation of regulators also results from the phenomenon known as regulator "creep". Gas passing through the cylinder valve at high velocities often carries scale and fine dirt from the cylinder into the regulator. It generally happens that much of this dirt lodges between the nozzle lip and the seat, where it may subsequently become imbedded in the seat surface when the outflow from the regulator is cut off and the seat is forced to a closure against the nozzle. The result is that the discharge of gas from the regulator nozzle is not sharply cut off when the outflow of gas from the regulator outlet is blocked by closing the torch valve. The consequent small nozzle leak causes the pressure within the regulator body to build up until the increased pressure against the diaphragm gives rise to a hermetic closure of the nozzle or, in severe cases, until the safety release vents the pressure.

It has been the practice to employ metallic screens for the inlet passage, but such screens, even of the finest mesh which are commercially available, are not completely effective in the first instance, and they have the drawback of clogging and caking over readily, the moisture carried by the gas with the particles of dirt and scale contributing in a considerable measure to this effect, with the result that the functioning of the regulator becomes impaired. They are also subject to rust and corrosion, and they conduct heat away from the gas to the walls of the passage. Curled hair, which has been proposed, is dangerous in an oxygen regulator by reason of its combustible nature. Hair usually contains oil, which is especially hazardous.

The difficulty is overcome in this invention by providing in the high pressure or inlet passage of the regulator a fibrous, elastic, non-hygroscopic, non-corroding, non-rusting, non-combustible and permanently permeable filter. For this purpose a mass of glass-wool fibers has proved exceedingly effective. The elasticity of such a filter in the high pressure or inlet passage of a regulator keeps the surface from caking over, and consequently the operation of the regulator will not suffer over a long period, the useful life of the filter being very great, and the life of the seat being indefinitely prolonged. Furthermore, I have ascertained that the glass wool filter is very markedly superior to the finest metallic screens that can be employed in its capability for preventing the passage of exceedingly minute particles to the seat of the regulator.

The invention likewise includes means for stopping regulator creep, due to whatever cause, if it should occur. It should be stated that this part of the invention relates to constructions in which the seat, or seat-holder, is not tied to the diaphragm. In cases where the seat-holder is fastened to the diaphragm through a stirrup, lever or other operative connection, in such a way that the seat-holder must move with the diaphragm in both directions, if any slight creep does occur the increased gas pressure against the diaphragm results in an added force which will limit or eliminate the creep. I prefer, however, not to fasten the seat-holder, or the stirrup or other operative connection to the diaphragm, since this materially simplifies construction and manufacture, and also enables the regulator to more satisfactorily meet certain conditions that arise as the result of abnormal use of the regulator. In order to overcome creep in a regulator of this construction I provide that there shall be at all times a certain residual stress in the adjusting or regulating spring or springs. It will be understood that the seat-holder is subject to opposing pressures of the adjusting or regulating spring and of a compensating spring, the function of the compensating spring being primarily to balance the force imposed on the seat by the high pressure gas within the nozzle. My plan involves making the compensating spring materially stronger than is necessary for this purpose, and providing an adjusting or regulating spring which is long and strong enough so that it is under some substantial compression or stress at all times, even when the adjusting screw is screwed all the way back relaxing the adjusting spring to the limit. The degree of this residual compression in the adjusting or regulating spring is such as to balance off the excess of stress provided in the compensating spring, so that normally the compensating spring applies approximately only the requisite pressure to the seat-holder. This is important since excessive pressure of the seat against the nozzle under regular working conditions would injure the seat, whereas one of the chief objects of the invention is to prolong the life of the seat. If, however, a creep should occur, the pressure of the adjusting or regulating spring is removed or overcome by the augmented gas pressure on the diaphragm and the compensating spring is permitted to apply part or all of its excess stress to the seat, thereby creating a pressure between the seat and nozzle great enough to kill the creep, unless it is of an extraordinarily serious nature.

Another difficulty encountered in the use of pressure regulators has been ignition of the seat material, or injury of the seat by an internal heating effect, which will either make the regulator inoperative or seriously affect its operation.

To understand this aspect of regulator behavior, let it be assumed that a full oxygen cylinder pressure of 140 atmospheres is suddenly applied to the oxygen within the high pressure passage of the regulator. Also assume the oxygen in this passage to have been practically at atmospheric pressure previous to the application of the 140 atmospheres of pressure. If there were no intermingling of the gas from the cylinder with that which was already in the high pressure passage, these conditions would result in a temperature rise of nearly 1700° F. Of course, the conditions of flow of the gas through the regulator passage results in an intermingling of the two bodies of gas to such an extent that a much more moderate rise of temperature is the usual result.

In order to clearly perceive the nature of the phenomena involved we must note that the volume of the original gas, which had occupied the entire inlet passage, has been reduced to 1/140th of its original bulk. This small amount of hot gas has been diluted with gas from the cylinder. The latter is practically at room temperature, except for the effect of the heat it has abstracted from the hot gas, because it has undergone approximately an adiabatic expansion and subsequently an adiabatic compression in flowing from the cylinder.

In actual practice the dilution of the hot gas is seldom uniform. Apparently the warmer portion of the gas is pushed to the end of the passage, namely to the seat surface in the usual type of regulator construction. One or two hundred degrees rise in temperature at the seat surface is sufficient to ignite the seat if some readily inflammable particle or material is present at the seat surface.

The most satisfactory means that I have found of avoiding high temperatures in the gas at the seat surface is the use of dead-end passages or cul-de-sac chambers. By the use of such passages the hotter portion of the gas is pushed past or away from the region of the seat. Turbulence is also promoted, which is favorable to the result desired, and in that connection it is also advantageous to so dispose the approach passage and the nozzle that the center line of the approach passage is somewhat eccentric to the center line of the nozzle.

Other features of the invention will become apparent as the specification proceeds and will be particularly pointed out in the claims.

In the accompanying drawings forming a part hereof:

Fig. 1 is a central longitudinal section through one form of the invention, the section being taken in the plane of the approach passage;

Fig. 2 is a fragmentary detail elevation of the seat-holder and the lower portion of the stirrup;

Fig. 3 is a cross-section on the line 3—3 of Fig. 1;

Fig. 4 is a plan view with the spring case and diaphragm removed;

Fig. 5 is a fragmentary section on an enlarged scale taken on the line 5—5 of Fig. 4, showing a portion of the diaphragm;

Fig. 6 is a fragmentary section taken on the line 6—6 of Fig. 1; and

Fig. 7 is a fragmentary view corresponding to a portion of Fig. 5, but showing an eccentric relation between the axes of the approach passage and the nozzle passage.

The numeral 1 designates the body of the regulator having an internally threaded rim 2, into which the lower end of the spring case or bonnet 3 is screwed, the margin of the diaphragm 4, which is preferably of rubber, being clamped between the body and the spring case. An inlet fitting 5 is screwed or otherwise secured in the body and carries a rotatable coupling nut 6 for making the connection with the conduit leading from the gas cylinder or the source of supply of gas under comparatively high pressure.

From the socket 7 into which the fitting 5 is screwed, a passage 8 is drilled to the rear portion of a filter chamber 9, which is formed in the body below the diaphragm. This end of the filter chamber is closed and rendered accessible by screwing into it the connection 10 of a high pressure gauge 11, though obviously a special closure plug might be employed. The chamber 9 is occupied by an elastic glass wool filter 12, which is retained at the outlet end of the chamber by a wire mesh shield 13. The effect of this filter on the operation of a regulator, and its safety, has been explained. It will be understood that the shield 13 may be of much larger mesh and fewer wires than the wire filter screens which have been employed. In the case of a wire mesh filter it is usually necessary to use a number of such very fine screens in the regulator, with the result that the filter corrodes and clogs readily, and extracts much heat from the gas. A glass wool filter does not have these drawbacks, and it is not combustible like curled hair, which would be exceedingly dangerous in an oxygen regulator. Oxygen regulators for cutting provided with glass wool filters in accordance with this part of the invention have been in continuous and exacting use for long periods without requiring replacement of the seats, whereas ordinarily a number of such replacements would be necessary with equivalent usage. Examination of the regulators shows that their filters retain their elasticity indefinitely and that while the surface exposed to the incoming gas becomes soiled it does not cake over. The filter is to a remarkable and practically absolute degree impenetrable by foreign particles, and on the other hand remains completely permeable to the requisite gas flow, which is equally important.

This feature of the invention is not limited to a type of regulator in which the seat or valve member closes against the high pressure.

From the outlet end of the filter chamber 9, an approach passage 14 extends transversely within the body of the regulator to the socket wherein a fine passage nozzle 15 is screwed, the passage 14 and the nozzle passage 16 being at right angles.

The seat 17 which cooperates with the extremity of the nozzle occupies and is guided in a recess in a seat-holder 18, and may project above the holder, which is desirable for removability. The seat-holder is pressed by a compensating spring 19 so as to normally hold the seat against the nozzle, closing the exit therefrom. The seat, seat-holder and compensating spring are disposed in a chamber 20 in an extension 21 of the body, which is closed by a screw cap 22 and a safety release disk 23, the cap 22 being formed with an opening 24 through which, in case of emergency, the high-pressure gas will escape upon bursting of the disk 23.

The seat 17 is not tightly or closely fitted and is preferably not retained by any retainer, in the seat-holder recess, sufficient clearance being left around the sides to permit the seat to have limited rocking movement in any direction upon a low spherical convexity 25 projecting from the bottom or back of the recess. This novel feature enables the seat at all times to abut squarely against the nozzle, notwithstanding the effect of manufacturing imperfections or tolerances and irrespective also of uneven seat indentation, while permitting the least amount of sidewise movement of the face of the seat relative to the nozzle. The engagement of the bar with the stirrup not only centers the latter but prevents the stirrup, unfastened to the diaphragm, from being turned so as to bear with disturbing friction upon the sides of the bridge 27. A possible relation is illustrated in a somewhat exaggerated manner in Fig. 5, wherein it will be evident that the pressure of the compensating spring will cause the seat to assume such position on the convex support 25 as to abut truly against the nozzle. An advantage of forming the convexity on the seat-holder rather than on the seat is that the seat is two-faced and therefore reversible.

The stirrup 26 bears at its upper end against the central portion of the diaphragm 4, the limbs of this stirrup straddling the bridge 27 of the body containing the high pressure approach passage 14 and passing downward through an opening or openings 28 into the chamber 20, where they engage notches 29 in the sides of the seat-holder, shoulders 30 on the limbs bearing against the seat-holder in the direction opposite to the pressure of the spring 19. The seat-holder is so formed as to be accurately guided by the wall of the chamber 20 without dashpot or cushioning action.

The stirrup or operative connection is not fastened to the diaphragm, nor, preferably, is the seat-holder fastened to the stirrup, each and both of which contribute to important simplicity of manufacture and convenience in assembling and taking apart. On removing the cap or closure 22, the compensating spring and the seat-holder can be at once removed, and the seat can then be dropped or picked out of the seat-holder.

The stirrup 26 is centered at its upper end by the flat bar 31, preferably of spring material, the ends of which are received in sockets 32 in opposite sides of the chamber 33 of the body, which lies beneath the diaphragm 4. The central portion of such member 31 is reduced in width to be received between the limbs of the stirrup and at opposite sides of the latter the centering member has shoulders 34 opposed to the edges of said limbs.

Adjusting springs or regulator springs 35, preferably two in number—a smaller and a larger spring, one within the other—are interposed between a diaphragm plate 36 and a washer 37, all within the spring case 3. The washer 37 may be thrust downward to compress the springs 35 more or less by an adjusting screw 38, which is threaded into the upper end of the spring case. The washer 37 is secured to the inner end of the screw 38 by a screw 40 in a manner to leave the washer free to turn, the functions of the washer being to act as a spring button and also as a lock to abut a shoulder 41 in the upper end of the spring case when the springs 35 are relaxed as much as they ever need be, and thereby prevent ready removal of the adjusting screw. In this way the threads of the screw 38 are saved from the abuse which they ordinarily encounter and which often makes regulators useless. Nevertheless if the owner of the regulator wishes to have the adjusting screw removable at any time, as is sometimes desired, in order that the regulator may not be used after hours or at any other time or for any reason, the fastening screw 40 can be taken out, leaving the washer as a free spring button and the adjusting screw free to be screwed out of the bonnet.

Another feature of value in the service of these regulators is the provision of a protective member interposed between the body of the regulator and the coupling nut 6, this member being formed in a simple manner of a collar or length of tube 43 welded or soldered, or otherwise secured, at one end to the body 1 and being of such length as to prevent the coupling nut 6 from slipping inward along the fitting so as to expose the finished joint surface 44 of the fitting. As clearly shown in Fig. 1, this causes the joint surface to be housed at all times within the cavity of the nut which extends beyond the end of the fitting. Thus, the joint surface is protected from accidental impacts, abrasion and dirt, which would result in leakage of the high-pressure gas entering the regulator.

The outlet or service connection of the regulator is marked 45 and the low pressure gauge is indicated at 46.

Returning to the approach passage for the high pressure gas 14, it will be noted that this passage is provided with a lining consisting of a glass tube 47, which extends from the filter chamber 9 to a point near the nozzle 15. The purpose of this lining is to overcome the precooling, choking and freezing effects which have previously been explained.

In place of the glass lining other heat-insulating materials, that is to say materials which will oppose or reduce the transfer of heat from the gas approaching the nozzle sufficiently for the purpose in view, may be employed. In addition, for a like purpose, the top and sides of the body portion 27 containing the approach passage are shown covered by rubber or other heat-insulating material 48. It is advantageous to use both forms of heat insulation for the approach passage, in conjunction, but either form may be used without the other, depending upon the specific design of the body. In each case the thermal insulating means extends interposed between the passage, which is traversed by the high pressure gas on its way to the nozzle or orifice, and the cooling influence of the gas in the low pressure part of the regulator. In the case of a thermal insulating lining, the interior of the passage is surrounded by the lining, and consequently the thermal insulation lies between the actual passage and the cold part of the regulator.

Attention is also directed to the dead-end chamber 49 formed by extending the high pressure approach passage 14 for a considerable distance beyond the entrance of the nozzle passage 16. This dead end chamber is not to be confused with the incidental or accidental drilling of the passage for a slight distance beyond the nozzle socket, which is likely to occur in ordinary regulator manufacture. The chamber 49 is designed to have a capacity, which must be vary large in relation to the capacity of the short, straight passage of the nozzle, such as to receive and entrap the heated end of the column of compressed gas which is forced into the high pressure passage when the gas is first turned on from the pressure cylinder, so that the high temperature that may be momentarily developed is prevented from reaching and injuring the seat 17. In this connection it is advantageous to terminate the lining 47 some distance short of the entrance of the nozzle passage in order that the expansion of the gas from the smaller internal diameter of the lining into the larger bore will produce turbulence causing mixing of the hotter and cooler portions of the gas, and thereby lowering the temperature. Turbulence is also promoted by an eccentric or offset relation between the approach passage and the nozzle passage, as shown in Fig. 7.

The dead-end chamber 49 which has been referred to may be formed in other ways than by extending the passage 14 as described. It may be an ample enlargement in length or diameter or both, and, while not necessarily in axial alinement, must be in such relatively direct and unconstricted communication with the approach passage that the hot wave-front will be forced into it rather than into the nozzle passage.

The adjusting or regulating spring 35 is of such length relative to its extreme confines that it will always be under a material degree of stress and can not be loose or entirely relaxed even when the screw 38 is run all the way out. This residual stress is employed to offset or neutralize an excess stress in the compensating spring 19, which is made considerably stronger, or amounting to the same thing made longer so as to be more highly compressed, than is necessary for its normal function of balancing the pressure of the gas issuing from the nozzle. Therefore, if creep should develop, the gas pressure building up beneath the diaphragm will overcome the counter-pressure of the springs 35, and allow the spring 19 to apply its normally neutralized excess to the seat to force it against the nozzle with sufficient power to kill the creep.

In connection with this part of the invention it may be explained that even though the glass wool filter be employed, so that extraneous bodies are kept out, there are likely to be particles of brass dust in the regulator itself which are capable of giving rise to creep by lodging between the seat and nozzle. This brass dust, which results from manufacturing operations, is very persistent, and some of it may remain even though the regulator body has been cleaned with extreme care before the assembling of the regulator. Examination of the seats of these regulators after a period of use has revealed the presence of these metallic particles.

When creep occurs it is quite important that the leak be stopped, which, in accordance with this invention, is accomplished by bringing into play a normally neutralized excess spring stress. This may result in the fine particle becoming fully embedded in the seat, which need not, however, impair the seat's usefulness. Naturally the larger and more numerous the particles, the greater the difficulty in respect to creep and the more effect there is upon the seat. Hence, the great value of a filter which reliably excludes pieces of cylinder scale and the like originating outside the regulator, without itself becoming clogged so as to reduce the flow of high pressure gas.

This completes a description of an illustrative and preferred embodiment of the invention. It will be understood that there may be numerous changes in details, proportions and arrangements, that parts of the invention may be used without others, and that they may be embodied in suitable form in specifically different types of regulators or reducing valves.

I claim:

1. In a gas pressure regulator wherein automatic gas pressure-controlled means coacts with an orifice, to maintain substantially uniform reduced pressure, a filter consisting of a mass of glass wool fibers disposed at a point in the passage traversed by the high pressure gas on its way to said orifice.

2. In a gas pressure regulator having automatic gas pressure controlled means including a seat coacting with an orifice to maintain substantially uniform reduced pressure in one part of the regulator, and a passage which is traversed by the high pressure gas on its way to said orifice, means in said passage to protect said seat comprising a filter consisting of a mass of fine glass fibers, together with a wire mesh shield in retaining relation to said filter at its downstream side.

3. In a gas pressure regulator, having an orifice and a member coacting therewith, said member closing against the high pressure, a diaphragm, an operative connection between the diaphragm and said member, which connection is not fastened to the diaphragm, an adjusting spring and means for adjusting the same, and a compensating spring to balance off the pressure of the high pressure gas against said member, said compensating spring being capable of applying an excess of stress to force said member against the orifice, the adjusting spring in relation to its confines providing for a substantial degree of residual stress in said spring to balance off the excess stress of the compensating spring.

4. In a gas pressure regulator and in combination with the nozzle having a short, straight passage and seat, an approach passage to the nozzle in angular relation to the nozzle passage and means providing a dead-end chamber in substantially direct and open communication with said approach passage beyond the entrance to the nozzle passage, said chamber being of very large capacity in relation to the nozzle passage and adapted to trap the highly heated front of the gas when the pressure is turned on suddenly and thereby to save the seat from excessive heating.

5. In a pressure regulator, a nozzle, a seat, and a movable seat holder having a recess with the seat inside the recess and loosely guided therein, said holder having a convex seat support at the back of said recess whereon said seat is capable of limited rocking within the recess.

6. In a pressure regulator for gases, having a diaphragm and a spring acting on the diaphragm, a body, a stirrup unfastened to the diaphragm, and a centering bar engaged at its middle with said stirrup and at its ends with the body, the engagement of said bar with the stirrup preventing said stirrup from turning, substantially as set forth.

GEORGE M. DEMING.